US005213818A

United States Patent [19]

Facchini et al.

[11] Patent Number: 5,213,818

[45] Date of Patent: May 25, 1993

[54] DEVICE FOR TAKING AND CONVEYING TABLETS COMING OUT OF A ROTARY TABLETTING MACHINE

[75] Inventors: Libero Facchini; Roberto Trebbi; Andrea Caselli, all of Bologna, Italy

[73] Assignee: I.M.A. Industria Machine Automatiche S.P.A., Bologna, Italy

[21] Appl. No.: 702,228

[22] Filed: May 17, 1991

[30] Foreign Application Priority Data

May 21, 1990 [IT] Italy ................................ 3515 A/90

[51] Int. Cl.[5] ...................... B29C 43/04; B29C 43/50; B29C 43/58

[52] U.S. Cl. ...................................... 425/139; 425/140; 425/162; 425/172; 425/348 R; 425/351; 425/353; 425/436 R; 425/436 RM; 425/437; 425/438; 425/444

[58] Field of Search ........... 425/350, 352, 353, 348 R, 425/436 R, 438, 444, 356, 135, 139, 140, 162, 437, 351, 436 RM, 172

[56] References Cited

U.S. PATENT DOCUMENTS

| | | | |
|---|---|---|---|
| 839,156 | 12/1906 | Kliewer | 425/350 |
| 1,846,999 | 2/1932 | Eaton | 425/350 |
| 2,408,803 | 10/1946 | Miller | 425/348 |
| 3,326,145 | 6/1967 | Austin | 425/353 |
| 3,384,035 | 5/1968 | Gabriel et al. | 425/350 |
| 3,545,007 | 12/1970 | Hamilton | 425/353 |
| 3,566,806 | 3/1971 | Forster | 425/350 |
| 3,677,673 | 7/1972 | Shapiro | 425/78 |
| 4,370,119 | 1/1983 | Watanabe | 425/352 |
| 4,408,975 | 10/1983 | Hack | 425/353 |
| 4,880,373 | 11/1989 | Balog et al. | 425/353 |
| 4,943,227 | 7/1990 | Facchini | 425/345 |
| 4,999,151 | 3/1991 | Hinzpeter | 264/40.4 |

FOREIGN PATENT DOCUMENTS

| | | | |
|---|---|---|---|
| 49110 | 3/1940 | Netherlands . | |
| 0517515 | 6/1976 | U.S.S.R. . | |
| 0861105 | 7/1981 | U.S.S.R. . | |
| 0863404 | 9/1981 | U.S.S.R. . | |
| 1021637 | 6/1983 | U.S.S.R. | 425/172 |
| 1481797 | 8/1977 | United Kingdom . | |
| 1481798 | 8/1977 | United Kingdom . | |

*Primary Examiner*—Jay H. Woo
*Assistant Examiner*—Joseph S. Leyson
*Attorney, Agent, or Firm*—Darby & Darby

[57] ABSTRACT

An ejection and conveying device mounted in a rotary pressing tabletting machine having matrices supported by a rotating table, whereinto upper punches and lower punches enter and come out, while tablets come out at an ejection station; the device includes a plate fastened to the machine and positioned under the table. Part of the plate is located under the machine's ejection station, while a rotating disk is placed inside a raised border of the plate and has a plurality of hollows whereinto the ejected tablets fall so that the tablets are drawn by the disk up to be positioned above one or more holes made in the bottom of the plate and from which holes discharge channels depart. The tablets pass through the holes and are brought away by the channels.

10 Claims, 4 Drawing Sheets

DEVICE FOR TAKING AND CONVEYING TABLETS COMING OUT OF A ROTARY TABLETTING MACHINE

BACKGROUND OF THE INVENTION

The present invention concerns the manufacturing of automatic machines for making items, e.g. tablets and the like, by compressing powders or granulated materials.

In particular, the present invention relates to a device that operates coupled with a tabletting machine that is used in the pharmaceutical production field.

DESCRIPTION OF THE PRIOR ART

In a known tabletting machine, described in the GB-1.481.797 and 1.481.798, there are hollows disposed radially on a rotating drum.

Inside and outside the drum, there are punches moved radially so as to enter and come out of the hollows, first allowing the introduction of the material in the hollows, then carrying out the compression of the material and lastly ejecting the tablets thus obtained out of the hollows.

A cam operates the inner punches, while an outer flexible ring operates the outer punches by rotating together with the drum and cooperating with rollers which cause the deformation of the ring.

In particular, one of these rollers causes the introduction, in turn, of the outer punches into the relative hollows until the operating head of each punch, in a phase subsequent to that of material compression, comes out of the hollow on the side of the corresponding inner punch, with this latter displaced inwards. Thus the tablet obtained is ejected, falls into the drum and is then collected by a discharge line.

The technical solution disclosed in the U.S. Pat. No. 4,403,935 relates to a compressing machine for making pharmaceutical tablets.

Also in this case, the matrices to make the tablets are disposed according to radial directions on a rotating drum.

The drum is disposed with the axis vertical and the punches, located inside and outside the drum, are operated axially.

In a portion of the circumference along which the matrices are driven, there is the ejection station. In that point the emission of the tablets is caused by the extended horizontal stroke of the outer punch.

Inclined walls convey the tablets towards a discharge line located below the rotating drum.

The U.S. Pat. No. 4,057,381 discloses a rotating table supporting a plurality of matrices disposed with their axis vertical.

In this case, the punches are disposed over and below the table and are vertically operated so as to enter and come out of the matrices.

The loading of the matrices with material is made from above and each tablet obtained is ejected by the upward extension of the stroke of the lower punch.

Then the tablet lies on the upper plane of the table, from where it is taken by suitable means.

As it results to be evident from what has been described above, with the equipments known heretofore, it is not possible to carry out a rational selection of tablets made by known tabletting machines.

In other words, it is not possible to determine which of the matrices has produced which tablet and when.

Therefore, it is not possible to carry out periodic checks on the operating conditions of each matrix as well as of means associated thereto.

In particular, it is not possible to check, with controls carried out at predetermined intervals of time, the weight of the tablets produced by each matrix, to verify the correct feeding of the matrices.

Even though it is possible to determine the rejection of tablets expelled from a matrix for which a possible malfunction has been detected, e.g. by detecting different pressures acting on the relative punches, it is not possible, however, to arrange for a new control on that matrix in a subsequent passage, in order to check the permanence of the malfunction.

Furthermore, it is not possible to establish a relationship between the results deriving from a statistical analysis of the finished products (weight, size and consistency of the tablets) and a malfunction detected when the tablet is made, e.g. by loading cells associated with punches.

Therefore, it could happen that a detected anomaly in the compression of a tablet is due to reasons either transitory, or unrelated to the compression in itself.

But such a transitory occurrence, which may be ascertained by an analysis of the finished product, cannot be related to the anomaly detected, and there is the risk to operate in a wrong way, e.g. by modifying the setting of the various devices, or to operate an unnecessary excessive rejection of product, in the attempt to discard the tablet, or tablets, actually not suitable.

Therefore a lack of co-ordination arises among the various checks, that has a negative impact on the quality general check of the product.

In conclusion, it is not possible to carry out a whole series of checks, co-ordinated verifications and other operations, because it is impossible to know which tablet has been made by which matrix, and when.

The same Applicant holds the Italian Patent Application No. 3746A/87 filed on Dec. 30, 1987, wherein a tabletting machine is disclosed, which comprises a turret, caused to rotate around its vertical axis, with a table fastened to the same turret.

Matrices for making tablets are located in the table and are disposed with their axis vertical.

Two series of punches are located above and below the table, respectively.

The punches are operated axially in turn, so as to enter and come out of the respective matrices, by suitable operating means.

The powdered material is loaded into the matrices through horizontal channels, each of them leading to a corresponding matrix.

The powdered material is urged through the channels by the action of centrifugal force due to the rotation of the turret.

After the compression of the powdered material, each tablet thus obtained is ejected by the upper punch, whose operating head is pushed so as to come out underneath the matrix, while the lower punch is moved downwards.

SUMMARY OF THE INVENTION

The object of the present invention is to provide a device suited to take the tablets produced by a tabletting machine, and operating in synchronism with the tabletting machine, so as to trace the origin of each tablet.

Another object of the present invention is to provide a device that carries out a selection of the tablets produced by a tabletting machine, in order to discard those which present unacceptable features, and to send some of them periodically to a control device, in order to verify the good functionality of each matrix and of the means associated thereto.

These and other objects, which shall be further explained below, are accomplished by means of a device for taking and conveying tablets produced by a rotary tabletting machine comprising a plurality of matrices supported by a table and disposed along the outer circumference of said table, with this latter being made to rotate axially.

A plurality of upper punches and lower punches, supported and guided by drums located above and below said table, these punches being moved so as to enter and to come out of said matrices, according to opposite movements, to compress a quantity of powdered material introduced into said matrices to obtain tablets further ejected at an ejection station.

The device comprises a fixed supporting plate fastened to the machine and positioned below the table, with a part of the border of the plate being located just below the ejection station in order to receive the tablets coming out.

A disk is located, with its axis vertical, inside a seating delimited by a raised circumferential border of the plate, and bears a plurality of hollows, extending radially and equally spaced, made to pass under the ejection station, so that the tablets drop into the hollows.

At least one hole is made in the bottom of the plate along the trajectory covered by the hollows and the tablets pass through the hole, thus falling in one discharge channel located below the plate under the hole.

There are means to rotate the disk in synchrony with the production and the ejection of the tablets, and means to support the moving means as well as the disk.

BRIEF DESCRIPTION OF THE DRAWINGS

The invention will be described further, with reference to the accompanying drawings, wherein.

DESCRIPTION OF THE PREFERRED EMBODIMENT

Figure 1:
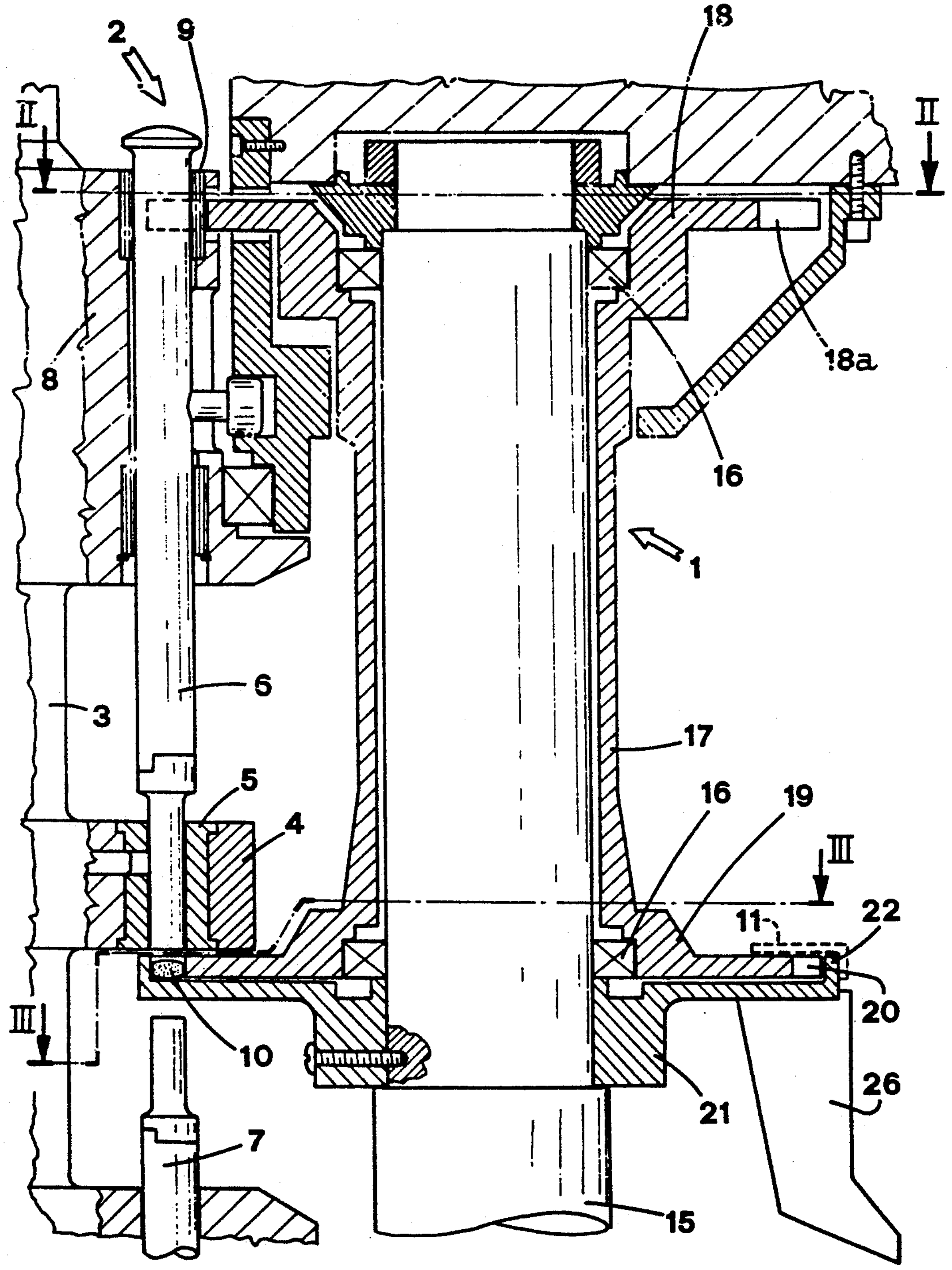
FIG. 1 is a lateral view, with parts in section, of the device made according to the invention and associated with a tabletting machine.
Figure 2:
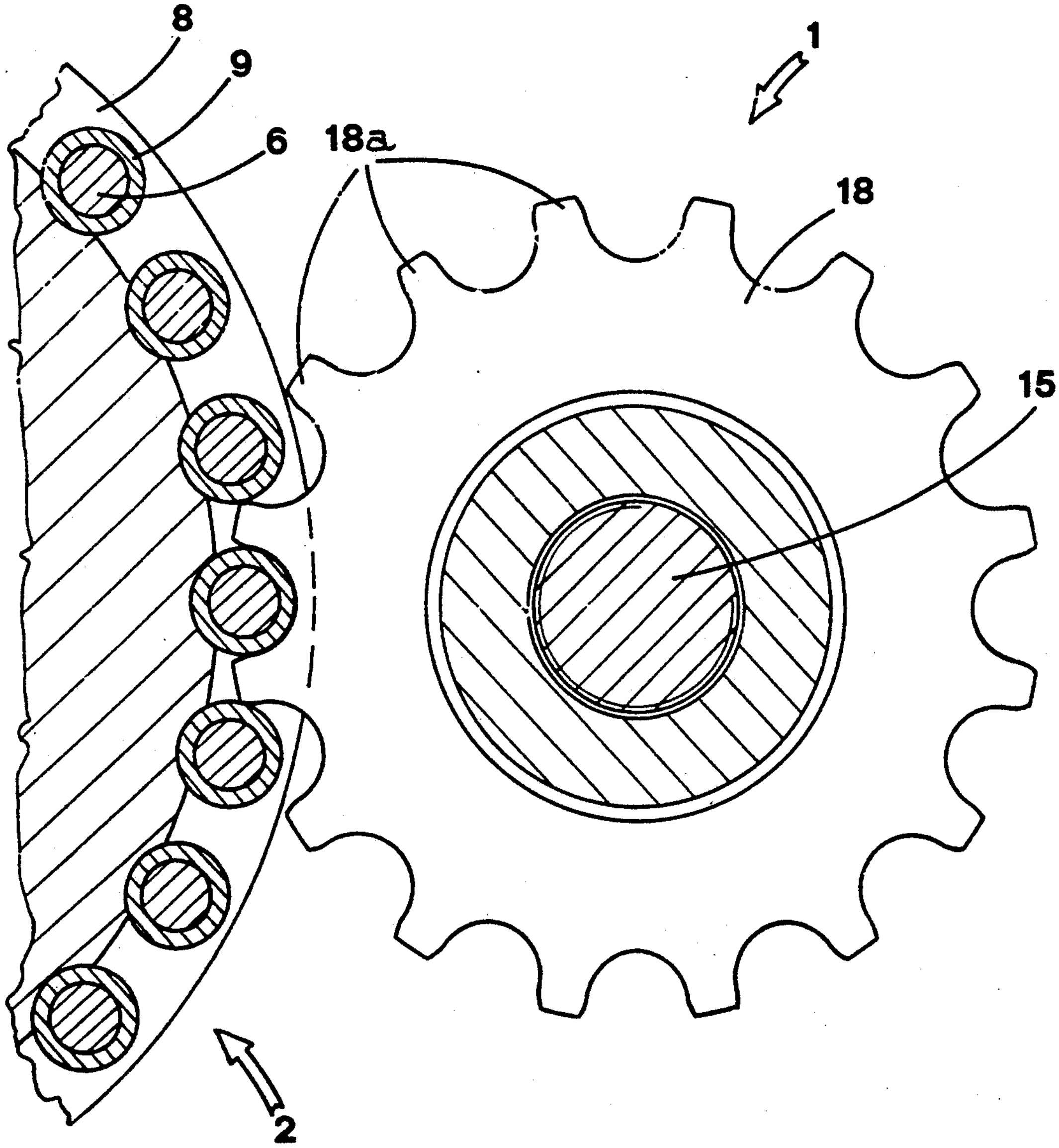
FIG. 2 shows a detail of the device, with this latter viewed from above, according to the section II—II of FIG. 1.
Figure 3:
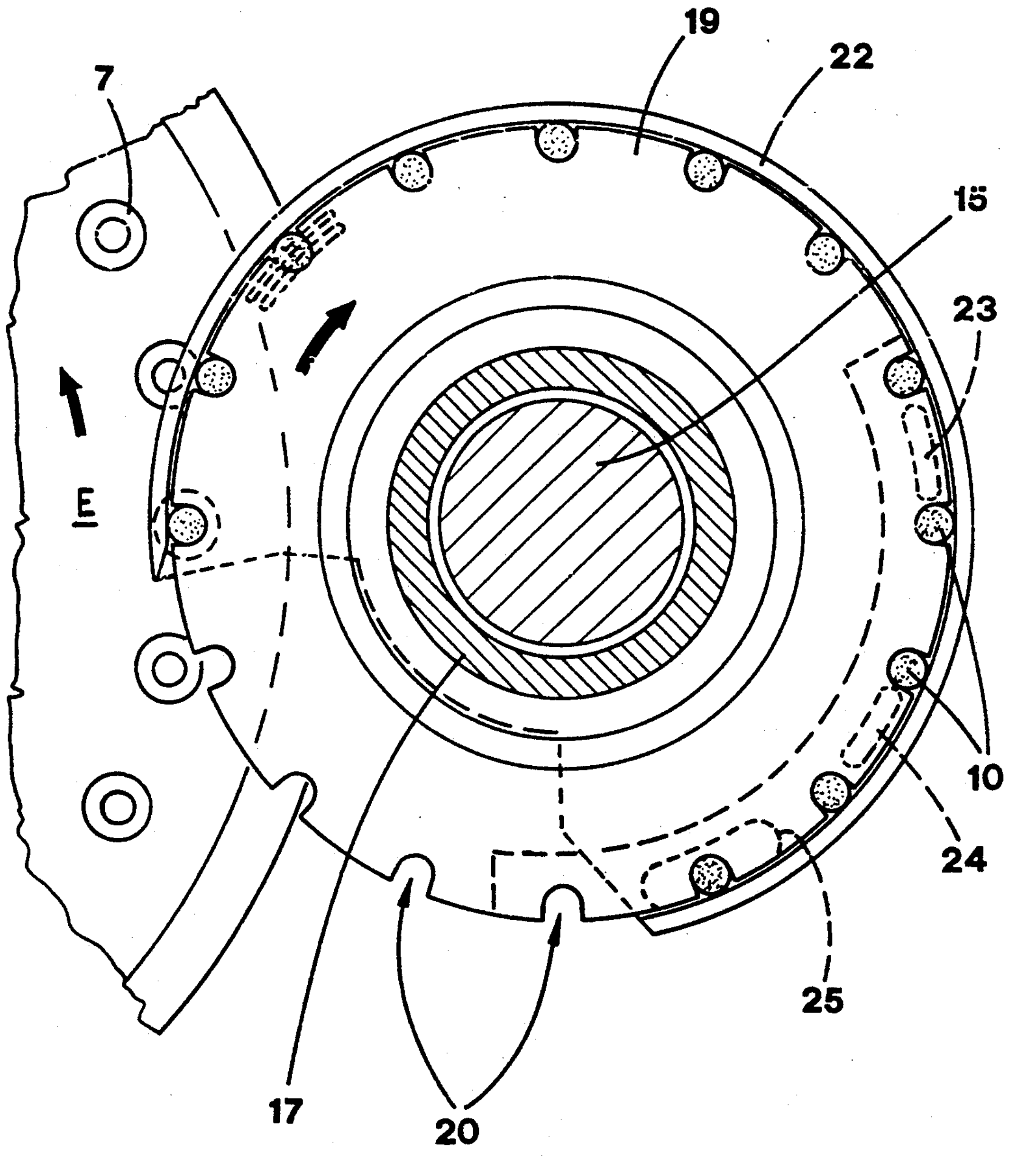
FIG. 3 shows the device viewed according to the section III—III of FIG. 1.

With reference to the above-mentioned drawings, the numeral 1 designates the device provided by the present invention, associated with a tabletting machine 2, made basically as described in the Patent Application No. 3746A/87 filed in Italy on Dec. 30, 1987, in the name of the same Applicant.

As mentioned above, the tabletting machine 2 comprises a turret 3 to which rotating table 4, is fastened.

Matrices 5 for making tablets 10 are housed in the table 4.

For each matrix 5 two punches are provided, an upper punch 6 and a lower punch 7, which are operated axially by means not illustrated, as described in the application No.3746A/87.

Above and under the table 4 there are drums designed to support and guide the upper punches 6 and the lower punches 7 respectively.

The upper drum bears a series of bushings 9 to support and guide the upper punches 6.

The device 1, that is the object of the present invention, is located close to a station E where the tablets 10 are ejected.

The ejection is caused by the downward axial translation of the upper punch 6, which pushes the tablet 10 out of the matrix 5 below the table 4.

A column 15 is fastened to the machine 2 with its axis vertical. On the column 15 a metal tube 17 is coaxially mounted by means of bearings 16 which allow the tube to rotate axially with respect to the column.

A crown gear 18 is made integral with the upper head of the metal tube 17 and is positioned so that its teeth 18*a* fit the bushings 9 supporting and guiding the upper punches 6.

In this way the crown gear engages with the upper drum 8 and thus with the turret 3, and the tube is made to rotate in synchronism with the turret 3.

A disk 19 is coaxially fixed to the lower head of the metal tube 17 just over a supporting plate 21 keyed onto the column 15 just below the table 4..

On the circumference of the disk 19 there are provided hollows 20 equally spaced angularly.

The "pitch" between two consecutive hollows 20 coincides with the "pitch" existing between two consecutive matrices 5 on the table 4.

The rotation of the turret 3 causes a corresponding rotation of the disk 19 in synchronism with the rotation of the table 4, so that the hollows 20 pass in turn below the matrices 5, in the ejection station E, during the ejection phase of the tablets 10.

The disk 19 is covered by a cover 11 fastened above the border 22.

The supporting plate 21, is located below the disk 19 is placed coaxially fastened to the column 15.

A raised border 22, is made along the circumference of the plate 21 and extends to enclose the disk 19, for 270 degrees approximately, starting from the area corresponding to the station E.

Close to the terminal part of the border 22 and along the trajectory of the hollows 20, three holes 23,24,25 are provided, having the purpose to discharge the tablets.

The device can work even in presence of a single hole, however, as described below, the presence of several holes makes it possible to select the tablets.

Under the plate 21 there are three discharge channels, made integrally in a single body 26, one for each hole.

It is evident that, in the case that a single hole is provided, or two holes, or three holes, in the plate 21, the number of channels shall be varied accordingly.

Furthermore, the channels can be made in several separate bodies, each of them comprising a single channel or several channels.

The operation of the device is described hereinafter.

The tablets 10 are ejected from the matrices 5 in the ejection station E and in turn drop into the hollows 20 of the disk 19.

Then the tablets are pulled along the route of the hollows, being supported from below by the plate 21, and being held inside the hollows by the raised border 22 and by the cover 11.

When the tablets reach the area with the three holes, then selecting means, not illustrated since they are known, are activated and cause the ejection of the tablet to be discarded, through the first hole 23 and through the first discharge channel.

These are, for instance, the tablets produced during the starting and stopping phases of the machine, or those coming out when special control means associated with the punches have detected an irregular compression of the tablet.

The tablet can also be discharged through the second hole 24 to be sent to a control device, through the second discharge channel.

Furthermore, and this is the most general case, the tablets are discharged through the third hole 25 and sent to a collecting container or to a packaging machine.

Figure 4B:
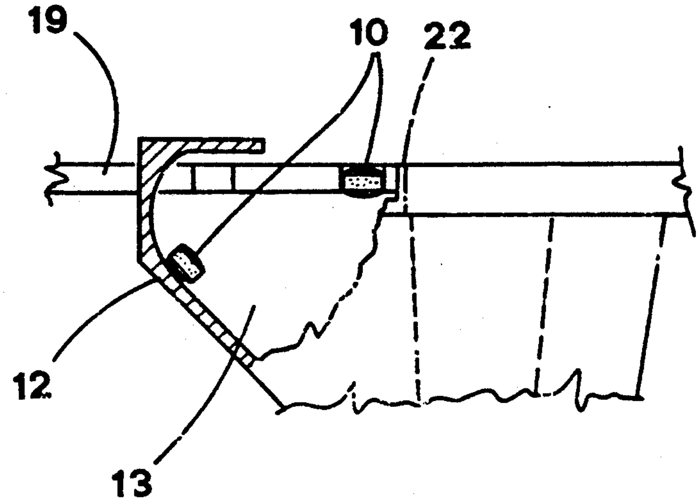
FIG. 4*a* and 4*b* are respectively top and front views of a particular embodiment of a detail of the device.
Figure 4A:
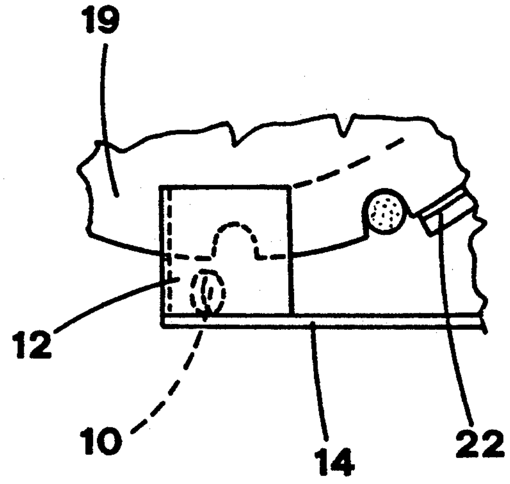

The third hole 25 can be omitted since the tablets can leave the device following a tangential trajectory, after the end of the raised border 22 (FIGS. 4*a* and 4*b*).

In this last case a special C-shaped conveyor 12 intercepts the tablets 10 which, by the action of inertia, tend to continue their run with a rectilinear trajectory, after the end of the raised border 22.

Then the C-shaped conveyor 12 conveys the tablets towards the relative discharge channel 13.

The conveyor 12 is closed on its front side by a front panel 14.

The selecting means can comprise ejectors suited to eject a jet of air after a start signal.

As it results from what has been said above, the adoption of the present device makes it possible to carry out a rational selection of the tablets coming out of the tabletting machine with which it is associated.

In other words, it is possible to determine which of the matrices has produced a tablet and in which moment, thanks to the relationship of phase existing between the movement of the disk 19 and the rotation of the table 4.

For example, following the detection, made by suitable means of known type, of differences of pressure acting on the punches, it is possible to determine the malfunctioning of a matrix, and without stopping the machine immediately, it is possible to selectively discard the tablets produced by that particular matrix.

Furthermore, it is possible to carry out periodic controls on the operating conditions of each matrix as well as of means associated thereto.

In particular it is possible to check at regular intervals of time the weight, height (or, more generally, the dimensions) and the consistency of the tablets produced by each matrix, in order to verify the correct feeding or the correct working of the matrices and of the means associated thereto.

By means of an electronic processing unit, operated by a suitable program, it is possible to check in turn all the matrices and to compare the results with the features of the tablet made by each of them.

As another option, it is possible to select a more frequent check on one or more matrices and a less frequent check on the other ones.

Moreover it is possible to modify, when necessary, the frequency of checks on the ground of the results accomplished each time and of the comparison with the previously obtained results.

All this can be done in a flexible way and in "real time" through the electronic management of the check procedure cooperating with the device here described that establishes a mechanical correlation between each matrix working and the tablet produced each time by the matrices.

The data resulting from the checks on the finished product are not lost, but they are stored in a memory and subsequently compared with new data as well as with other data collected while obtaining the products (e.g. by loading cells associated with the punches).

Hence it is possible to draw a real diagram of the operating features, as they are recorded time by time, for each matrix and for the means associated thereto.

According to such diagrams, virtually drawn in the computer memory, the machine is able to fix whether and when it is necessary to discard the tablets ejected from a matrix, or to arrange a more frequent series of checks on a particular matrix, or when it is necessary to modify any parameter before stopping the machine for a more radical intervention.

All the skilled in the field will surely acknowledge the opportunities offered by this device, so designed, to check and modify the operating modes of the machine.

In conclusion, the present invention provides a system for self-checking the settings of the tabletting machine, with obvious advantages. The object of the invention is therefore accomplished through the device described hereby, which takes the ejected tablets keeping the phase correlation with the tabletting machine, so as to trace the origin of each tablet.

It is understood that the above has been described by way of example and it is not restrictive, therefore any other possible embodiment of the device described above is to be considered as covered by the patent hereby applied for, as described above and as claimed here below.

What is claimed is:

1. A device for taking and conveying tablets produced by a rotary tabletting machine comprising:

a plurality of matrices supported, disposed in a circle by an axially rotatable table; a plurality of upper punches and lower punches supported and guided by drums located above and below said table means for moving said punches to enter and to come out of said matrices according to opposite movements, to compress a quantity of powdered material introduced into said matrices to obtain tablets to be ejected at an ejection station;

a fixed supporting plate fastened to said machine and positioned below said table, a part of said plate being located just below said ejection station in order to receive said tablets coming out therefrom;

a disk with its axis vertical inside a seating delimited by a raised circumferential border of said plate, said disk having a plurality of hollows extending radially and equally spaced and positioned to pass under said ejection station so that said tablets drop into said hollows;

at least one hole in the bottom of said plate along a trajectory traversed by said hollows, said tablets falling into said hole while passing above it;

at least one discharge channel located below said plate under said hole so as to receive said tablets passing through said hole;

means to rotate said disk in synchronism with production and ejection of said tablets; and means to support said moving means and said disk.

2. A device according to claim 1, wherein said support means comprises a column fixed with its axis vertical to said machine adjacent to said ejection station, said moving means comprising a metal tube coaxially disposed on said column, said metal tube being connected at its bottom with said disk and at its top with a crown gear engaging with rotating means of said machine.

3. A device according to claim 1, wherein there are three holes in the bottom of said plate for selecting and discharging said tablets;

selecting means operating adjacent to each of said holes to discharge each of said tablets through a proper hole;

a respective discharge channel provided below said plate for each of said holes having an opening corresponding to its associated hole.

4. A device according to claim 1, wherein there are: two holes in the bottom of said plate for selecting discharging said tablets; selecting means operating adjacent to each of said openings to discharge each of said tablets through a proper hole; a respective discharge channel located below said plate for each of said holes, each of said discharge channels having an opening matching with its corresponding hole;

a third discharge channel located adjacent to a terminal point of said raised border to receive said tablets tangentially coming out of the device by virtue of centrifugal force; and a conveyor to convey said tablets tangentially coming out of the device by virtue of centrifugal force towards said third discharge channel.

5. A device according to claim 3, wherein said discharge channels are made integral in a single body.

6. A device according to claim 3, wherein said selecting means are operated in synchronism with the rotation of said disk and with the motion of said machine.

7. A device according to claim 2, wherein said metal tube is fastened at its bottom concentrically to said disk.

8. A device according to claim 2, wherein said crown gear engages with bushings provided on one of said drums of said machine.

9. A device according to claim 3, said selecting means comprising ejectors which eject a jet of air in response to a signal received from an electronic control unit.

10. A device according to claim 1, wherein said disk is covered by a cover fastened over said border.

* * * * *